United States Patent
Bracker et al.

(10) Patent No.: US 8,808,071 B2
(45) Date of Patent: Aug. 19, 2014

(54) CONTROL UNIT FOR ACTUATING A PRESSURE VALVE, IN PARTICULAR A DIFFERENTIAL PRESSURE VALVE OF AN AIRCRAFT CABIN

(75) Inventors: Klaus-Heinrich Bracker, Hanau (DE); Robert Hamrodi, Muhlheim am Main (DE); Rudiger Maier, Maintal (DE); Roland Singpiel, Frankfurt am Main (DE); Felix Eisenlohr, Siering (AT); Oliver Pokern, Bruchkobel (DE)

(73) Assignee: Nord-Micro AG & Co. OHG, Frankfurt (DE)

( * ) Notice: Subject to any disclaimer, the term of this patent is extended or adjusted under 35 U.S.C. 154(b) by 1310 days.

(21) Appl. No.: 12/517,513

(22) PCT Filed: Dec. 5, 2007

(86) PCT No.: PCT/EP2007/063378
§ 371 (c)(1),
(2), (4) Date: Dec. 10, 2009

(87) PCT Pub. No.: WO2008/068295
PCT Pub. Date: Jun. 12, 2008

(65) Prior Publication Data
US 2010/0317276 A1    Dec. 16, 2010

(30) Foreign Application Priority Data
Dec. 6, 2006    (DE) .......................... 10 2006 057 549

(51) Int. Cl.
*B64D 13/04*    (2006.01)
*F16K 31/122*    (2006.01)
*F16K 31/126*    (2006.01)
*F16K 17/06*    (2006.01)

(52) U.S. Cl.
CPC ............... *F16K 17/06* (2013.01); *F16K 31/126* (2013.01)
USPC ................................ 454/73; 137/494; 454/72

(58) Field of Classification Search
USPC ................... 137/505.14, 505.37, 87.01, 494; 454/70, 71, 72, 73, 76; 244/117 R, 244/118.5, 129.1
See application file for complete search history.

(56) References Cited

U.S. PATENT DOCUMENTS 1,631,262 A * 6/1927 Gourdou ...................... 137/81.1
2,305,975 A    12/1942 McKinley (Continued)

FOREIGN PATENT DOCUMENTS

DE    1809220 A    6/1970
DE    2055878 A    5/1971

(Continued)

OTHER PUBLICATIONS

PCT/EP2007/063378 International Search Report, dated Feb. 5, 2008, 3 pages.

*Primary Examiner* — Stephen M Hepperle
*Assistant Examiner* — Ferderick D Soski
(74) *Attorney, Agent, or Firm* — Brian B. Shaw, Esq.; Thomas B. Ryan; Harter Secrest & Emery LLP

(57) ABSTRACT

A control unit (100) for actuating a pressure valve, particularly for actuating an overpressure valve in an aircraft cabin, comprises an actuating body (20) and a pressure-controlled actuator (30) for the actuation of the actuating body (20) as a function of a predetermined threshold pressure valve, wherein the threshold pressure value can be adjusted by means of an adjustment device (40, 50). The adjustment device (40, 50) comprises a first adjustment unit (40) and a second adjustment unit (50), wherein the actuating body (20) can be adjusted by means of the first adjustment unit (40), and the actuator (30) can be adjusted by means of the second adjustment unit (50).

28 Claims, 2 Drawing Sheets

(56) References Cited

U.S. PATENT DOCUMENTS

| | | | | |
|---|---|---|---|---|
| 2,306,382 A | * | 12/1942 | Fink et al. | 137/81.1 |
| 2,313,149 A | * | 3/1943 | Jacobsson | 137/81.1 |
| 2,583,006 A | * | 1/1952 | Niesemann | 137/81.1 |
| 2,618,125 A | * | 11/1952 | Fischer | 62/172 |
| 2,619,334 A | * | 11/1952 | Tissier | 261/47 |
| 2,651,985 A | * | 9/1953 | Warstler | 454/73 |
| 2,665,624 A | * | 1/1954 | Arthur | 454/73 |
| 2,873,754 A | * | 2/1959 | Dunaway | 137/81.1 |
| 3,137,308 A | * | 6/1964 | Machlanski et al. | 137/505.15 |
| 3,252,470 A | * | 5/1966 | Elly et al. | 137/81.1 |
| 3,450,020 A | * | 6/1969 | Andresen, Jr. | 454/73 |
| 3,650,197 A | * | 3/1972 | Voronin et al. | 454/73 |
| 3,699,998 A | | 10/1972 | Baranowski, Jr. | |
| 3,703,139 A | | 11/1972 | Furlong | |
| 3,706,270 A | | 12/1972 | Furlong | |
| 3,709,242 A | * | 1/1973 | Chase | 137/81.1 |
| 3,856,042 A | | 12/1974 | Fletcher et al. | |
| 3,974,752 A | | 8/1976 | Burgess et al. | |
| 4,463,897 A | | 8/1984 | Denneny, Jr. et al. | |
| 4,480,657 A | | 11/1984 | Marshall | |
| 4,546,791 A | | 10/1985 | Huang | |
| 5,065,788 A | | 11/1991 | McManigal et al. | |
| 5,404,904 A | | 4/1995 | Glaser | |
| 2006/0025064 A1 | * | 2/2006 | Horner et al. | 454/74 |

FOREIGN PATENT DOCUMENTS

| | | |
|---|---|---|
| DE | 2055879 A | 6/1971 |
| DE | 3143693 A1 | 7/1982 |
| DE | 4000694 A1 | 7/1991 |
| DE | 4445588 A1 | 6/1996 |
| DE | 20220348 U1 | 7/2003 |
| FR | 1209004 A | 2/1960 |
| GB | 945477 A | 1/1964 |
| JP | S51-74400 | 6/1976 |
| WO | 00/28394 A1 | 5/2000 |

* cited by examiner

CONTROL UNIT FOR ACTUATING A PRESSURE VALVE, IN PARTICULAR A DIFFERENTIAL PRESSURE VALVE OF AN AIRCRAFT CABIN

CROSS-REFERENCE TO RELATED APPLICATIONS

This application is a §371 of International Application No. PCT/EP2007/063378 filed on Dec. 5, 2007 claiming §119 foreign priority to German Patent Application No. 10 2006 057 549.0 filed on Dec. 6, 2006.

BACKGROUND OF THE INVENTION (1) Field of the Invention

The present invention relates to a control unit for actuating a pressure valve, in particular a pressure relief valve of an aircraft cabin. The control unit comprises an actuating body and a pressure-controlled actuator for operating the actuating body as a function of a predetermined threshold pressure value. The threshold pressure value is adjustable by an adjustment means.

(2) Description of Related Art

To protect an aircraft cabin against overloading due to excessive differential pressure between the cabin pressure and the ambient pressure independently of electronic regulating systems, usually a safety valve is used with a control unit in the form of a mechanical-pneumatic pressure switch. Such a conventional pressure switch comprises a sensor unit and a switching unit. The sensor unit includes a working spring, an adjustment spring and a power diaphragm. Depending on the rotation of an adjustment screw, the bias on the adjustment spring can be varied. However, the working range of the pressure switch is determined by the bias of the working spring. This working spring is fixed during assembly of the control unit, which fixes the bias and therefore the working range. The unit is assembled in such a way that the adjustment spring counteracts the working spring, wherein the switching point of the pressure switch results from the sum of the two counteracting spring biasing forces. To trigger the switching unit, a displacement is generated by means of the power diaphragm starting from a predetermined magnitude of the threshold pressure value, wherein a pressure force is applied to its active surface as a result of applying the differential pressure to it, wherein the displacement operates a valve tappet of the switching unit and thus brings a valve body, for example, into its open position.

In these well-known control units it has been found disadvantageous that the more stringent requirements with respect to the switching accuracy and the long-term behavior can no longer be fulfilled on the basis of the conventional design.

SUMMARY OF THE INVENTION

It is therefore the object of the present invention to provide a control unit for actuating a pressure valve, which achieves higher switching accuracy and withstands external influences with respect to its long-term behavior.

To achieve this object, in a control unit for actuating a pressure valve of the initially mentioned type, it is provided that the adjustment means comprises a first adjustment unit and a second adjustment unit, wherein the actuating body is adjustable by means of the first adjustment unit and the actuator is adjustable by means of the second adjustment unit.

The control unit according to the present invention is based on the idea, among others, to use one of the adjustment units for coarse adjustment, for example that of the pressure working range, the initial position of the actuator or actuating body, or the threshold pressure value, and to use an adjustment unit different from the above-mentioned adjustment unit for fine adjustment of at least one of the above-mentioned parameters. In other words, an adjustment system is suggested having at least two stages, wherein a coarse adjustment is carried out by means of at least one first stage and a fine adjustment of the desired parameters is carried out by means of at least one second stage.

By these means it is possible to use the actuating body as a part of a valve, for example a needle valve, or for flow-through regulation of a pressurized medium to control a downstream valve. The suggested control unit is also referred to as a pressure switch.

In a preferred embodiment, the plural adjustment options are adapted and arranged in such a manner that it is possible to change the relative position of the actuating body with respect to the actuator or vice-versa and/or to change the biasing force of at least one spring unit operatively connected to an adjustment unit, the actuating body or the actuator.

The control unit according to the present invention is preferably used to control the pressure differential between an aircraft cabin and the ambient atmosphere. Basically, the control unit is also generally useful for controlling a pneumatically operated apparatus.

By selectively biasing the forces between the actuator and the actuating body, oscillations of the spring-mass system are suppressed. Moreover, the mass of the spring-mass system is additionally reduced, whereby the resonant frequency can be shifted to higher, less critical values. These effects lead to improved vibrating behavior, i.e., to a control unit or pressure switch which is less sensitive to vibrations.

Another advantage is seen in view of the long-term stability, since unstable states can be reduced. Changes in the setpoint, for example, by rotation of springs or irregular lifting-off of the valve spring plate can be avoided. The operating behavior of the control unit can be essentially defined by the properties of the actuator, in particular when using a pressure capsule (e.g. NiBe2) as an actuator. A combination of springs with a power diaphragm of rubber is not necessary. Moreover, ageing effects, such as creep of the materials, can be avoided.

Improved thermal behavior can also be achieved. By suitably choosing the geometry or dimensions and materials, the components or parts of the control units can be adapted in such a way that changes resulting from external influences, in particular from thermal effects, largely compensate each other or cancel each other out. In this way a control unit which is less sensitive in its thermal behavior than conventional designs can be created. This can also be referred to as active temperature compensation. To effectively achieve temperature compensation, the materials can be chosen in particular in terms of suitable coefficients of linear expansion or coefficients of thermal expansion and/or modulus of elasticity, In particular, the pairing of components, i.e., for example, the mutual tuning of the materials and coefficients of linear expansion of the pressure capsule in relation to the housing and the actuating body, can substantially improve the thermal sensitivity in comparison with an uncompensated pressure capsule.

An advantageous embodiment provides that the second adjustment unit is adapted for coarse adjustment of the threshold pressure value and the first adjustment unit is adapted for fine adjustment of the threshold pressure value, or vice-versa. This facilitates precise adjustment of the operating pressure or switching point for the operation of the actuating body by the actuator.

Advantageously, the actuator comprises a membrane body deformable as a function of pressure. In other words, the membrane body undergoes more or less deformation as a function of the pressure applied. In an advantageous embodiment, the membrane body comprises a bellows or a pressure capsule made of metal. In contrast to the conventional structure with two pressure springs and a power diaphragm, such a membrane body shows improved switching behavior due to its reduced hysteresis. In this way, for example, a displacement generated by the actuator can provide for operation of the actuating body exclusively by a metallic pressure capsule or a metal bellows. Furthermore, the pressure capsules constructed in one or more stages have excellent long-term behavior.

In a further advantageous embodiment, the first adjustment unit and/or the second adjustment unit includes a variably adjustable actuating element, in particular a rotatable threaded element, to change the distance between the actuating body and the actuator. By means of simple components such as a threaded sleeve, a fine adjustment can be achieved with high reproduceability.

In an advantageous embodiment, the first adjustment unit comprises a first carrier for holding and variably positioning the actuating body in a first chamber and/or the second adjustment unit comprises a second carrier for holding and variably positioning the actuator in a second chamber. In this way the actuator, preferably a pressure capsule, can be held in the second chamber by means of the second carrier, and can be subjected to a differential pressure resulting from the difference between the cabin pressure and the ambient pressure.

In an advantageous embodiment, the first carrier and/or the second carrier comprises a carrier thread, which can be preferably brought into engagement with a housing thread. The first adjustment unit, or the second adjustment unit, can thus be easily installed by means of the first carrier and the second carrier, respectively, and by simply rotating one or all carriers, the distance between the actuating body and the actuator can be changed and the threshold pressure value can be adjusted. It is useful if the first and/or second carriers are rotatably supported in an opening provided with respective threads in the housing side wall. The threads are used to attach the carriers and adjustment units onto the housing of the control unit, as well as to position the actuating body and/or the actuator.

It is also advantageous if the first carrier and/or the second carrier comprise a fixing element for securing the first carrier and/or the second carrier, wherein the carrier thread can preferably be brought into engagement with a housing thread. Further, the fixing element can be brought into engagement with the carrier thread. The desired functions of the components can thus be achieved by simple threaded elements and a small number of required parts.

Preferably, an ambient pressure can be applied to the second chamber via a first channel, and a cabin pressure can be applied to the actuator via a second channel.

To further reduce the number of parts of the control unit, the second carrier also forms the second channel. In other words, the second channel is integrated in the second carrier and extends preferably along an interior tubular channel.

In another preferred embodiment, a spring unit is coupled with the actuator and/or the actuating body. In other words, the actuator, the actuating body or both the actuating body and the actuator can be operatively connected to a spring unit, which can also be at the same time part of one or more of the adjustment units. In an alternative, the spring unit can be interposed between the actuator and the actuating body.

With reference to the actuating body, it is advantageous if it comprises a slidably guided piston, in particular a valve tappet. Such a piston or tappet can be biased in an open position or a closed position, for example, by means of the spring unit. At the same time, the bias of the spring unit can be used to vary the switching point within a small range as a function of the bias.

In an advantageous embodiment the actuating body comprises a valve body for opening or closing a connecting line which is preferably in communication with the first chamber. In this way, the first chamber can be at least partially a part of the connecting line, whereby the valve body can close or open a passage through the connecting line. Advantageously the valve body has a sealing unit, in particular a sealing edge to open or close the connecting line. The sealing edge can be provided, for example, by a sealing cone held in the closed position by a force exerted, for example, by the spring unit.

Advantageously the control unit comprises a housing, wherein the first adjustment unit and the second adjustment unit are formed and arranged to be accessible from a housing side. This facilitates the simple adjustment of the adjustment units also in constricted conditions, as is often the case. Basically, the adjustment units can be formed and arranged so that they can be operated from different housing sides or housing sections.

In a further preferred embodiment, the dimensions and material characteristics of the individual components of the control unit, in particular the actuating body, the valve tappet, the actuator, the adjustment units, the carriers, the spring unit and/or the housing, or individual housing sections, are selectively tuned with respect to each other to compensate thermal influences. The linear expansions and influences on the modulus of elasticity can thus be compensated and the thermal stability of the control unit can be ensured. Advantageously, the different coefficients of thermal expansion of the components are used in such a manner that the individual effects from the respective thermal influences on the modulus of elasticity of the component is compensated in its sum. In this way, the thermal influence acting on the actuator, for example in the form of a pressure capsule, can be compensated. Furthermore, the displacement/pressure characteristic of the capsule is adapted in such a way that the temperature compensation has a uniform effect over a wide pressure range (useful range).

In a preferred embodiment, the first housing section, second housing section, the actuating body, the actuator, in particular the pressure capsule, at least one of the adjustment units, at least one of the carriers and/or the spring unit comprise at least a coefficient of linear expansion as a material characteristic, wherein the coefficients of linear expansion of at least two of the above-mentioned components are selectively tuned with respect to each other to compensate thermal influences.

Furthermore, the first housing section, the second housing section, the actuating body, the actuator, in particular the pressure capsule, at least one of the adjustment units, at least one of the carriers and/or the spring unit can comprise at least a modulus of elasticity as a material characteristic, wherein the moduli of elasticity of at least two of the above mentioned components are selectively tuned with respect to each other to compensate thermal influences.

By suitably choosing the coefficients of linear expansion or coefficients of thermal expansion and/or moduli of elasticity and/or the geometry or dimensions, the components or parts of the control unit can be adapted in such a way that changes resulting from external influences, in particular thermal influences, largely compensate each other or cancel each other out.

A control unit which is less sensitive in its thermal behavior than conventional designs by a factor of 10 to 20 can thus be created. This can also be referred to as active temperature compensation.

In particular by pairing the components, i.e., for example, the mutual tuning of materials and the coefficients of linear expansion of the pressure capsule in relation to the housing and the actuating body, the thermal sensitivity can be improved by a factor of 10 to 20 in comparison with an uncompensated pressure capsule.

Furthermore, the vibration sensitivity can be improved by a factor of 30 in comparison with conventional designs having a rubber membrane, for example.

With respect to the gravitation sensitivity, an improvement by a factor of about 4 can be achieved. Further, excellent long-term stability can be achieved (for example of less than about 2 hPa after one million pressure cycles).

Also, such a control unit is less prone to hysteresis.

Advantageously, the actuator has a working range and a characteristic, and essentially constant thermal compensation is adjustable within the working range.

Preferably, the actuator comprises a pressure capsule having a working range from about 300 mbar to about 900 mbar, in particular from about 500 mbar to about 700 mbar, and the characteristic of the pressure capsule is adapted so that an essentially constant thermal compensation is adjustable within the working range.

In a preferred embodiment the actuating body and the actuator are spaced from each other in a predefined distance in a first position, and in contact with each other in a second position for the operation of the actuating body. As a consequence of the distance present in the first position, it is to be avoided that these components are subject to wear due to vibrations and the resulting friction between the components. Furthermore, no self-vibrations arise in such an embodiment. The distance can be chosen as a function of the predetermined threshold pressure value or the switching point.

In another advantageous embodiment it is provided that the actuating body and actuator are continuously, preferably permanently, in contact during the intended use of the control unit. This is preferably achieved by holding the actuating body continuously, preferably permanently, in the second position by means of the force exerted by the spring unit. In other words, the actuating body is held in a position pressed against the actuator. Again, the necessary biasing force of the spring unit can be adjusted via the carrier, for example. Any vibrations and wear resulting from it because of the components contacting each other and any drift of the switching point can thus be reduced or eliminated.

Furthermore, the actuator can be provided with an operating unit, in particular a sensing plate, which can be brought into contact with the actuating body. Such a plate is of a hard wearing material, for example stainless spring steel, jewel or ceramic, to avoid erosion and therefore drift due to a length variation of the valve tappet.

BRIEF DESCRIPTION OF THE SEVERAL VIEWS OF THE DRAWINGS

The invention will now be described in more detail in the following with reference to accompanying drawings, wherein.

DETAILED DESCRIPTION OF THE INVENTION

Figure 1:
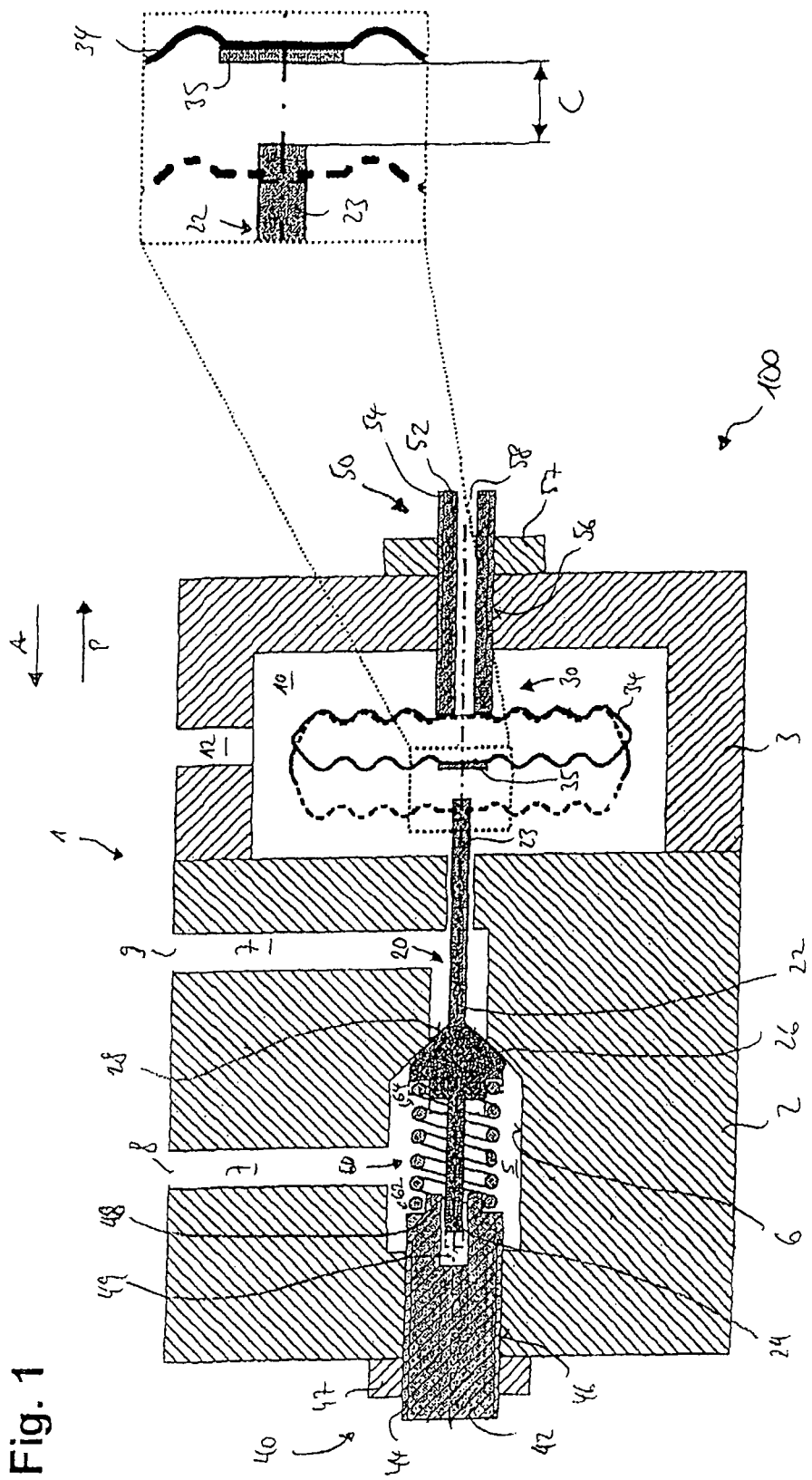
FIG. 1 is a longitudinal sectional view of a first embodiment of the control unit according to the present invention.
Figure 2:
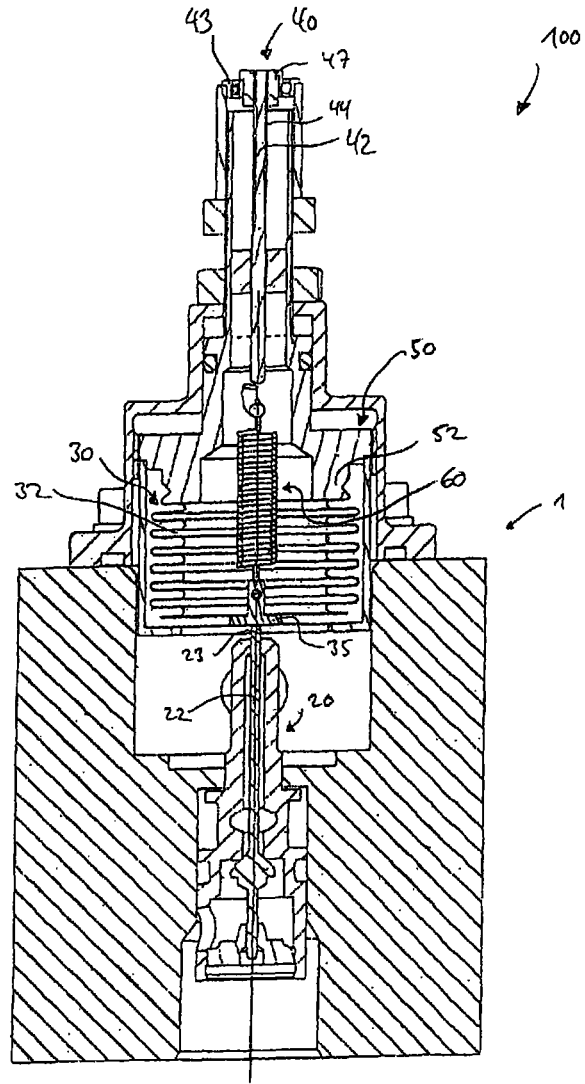
FIG. 2 is longitudinal sectional view of a second embodiment of the control unit according to the present invention.

The control units 100 shown in FIGS. 1 and 2 are for operating a pressure relief valve of an aircraft cabin.

Control unit 100 shown in FIG. 1 comprises a housing 1 with a first housing section 2 and a second housing section 3. The two housing sections 2, 3 are connected with each other by screw connections. In the first housing section 2, a connecting line 7 is arranged with a first opening 8 and a second opening 9. A first chamber 5 is partially a part of connecting line 7 and has an inner side wall 6. The second housing section 3 has a second chamber 10 to which an ambient pressure can be applied via a channel 12.

Furthermore, control unit 100 comprises an actuating body 20 positively guided by first housing section 2 in the form of a valve tappet 22, and an actuator 30 arranged in second housing section 3 within second chamber 10. Valve tappet 22 hat a first end 23 and a second end 24 and, between these ends 23, 24, a sealing cone 26 as a valve body for closing or opening the connection line 7. In the closed position of sealing cone 26 shown in FIG. 1, a sealing edge 28 of sealing cone 26 is in sealing abutment on an inner side wall 6 of first chamber 5. Actuator 30 is formed as a membrane body in the form of a pressure capsule 34. This pressure capsule 34 is positioned in second chamber 10 and has a sensing plate 35 provided for contacting first end 23 of valve tappet 22.

On the one hand, actuating body 20 is variably positionable by means of a first adjustment unit 40 in relation to first housing section 2, and on the other hand fixable on it. For this purpose, first adjustment unit 40 comprises a first carrier 42 in the form of an adjustment sleeve with an outside adjustment thread as a carrying thread 44, which is in engagement with first housing section 2 via a housing thread 46. A fixing element 47 in the form of a counter nut is for further fixing first carrier 42 on housing 1.

A protrusion 48 is provided on the end of first carrier 42 extending into chamber 5, on which a spring unit 60 is fixed with its first end 62. A second end 64 of spring unit 60 is fixed on a projection of sealing cone 26 of actuating body 20. Spring unit 60 couples actuating body 20 with first adjustment unit 40. The bias exerted by spring unit 60 acts as a restoring force effective in a direction B on valve tappet 22 and holds the latter in its closed position in a sealing relationship on inner side wall 6 at an actual pressure below the threshold pressure value.

On the one hand, the actuator is variably positionable by means of a second adjustment unit 50 in relation to second housing section 3, and on the other hand fixable on it. For this purpose, second adjustment unit 50 comprises a second carrier 52 in the form of an adjustment sleeve with an outside adjustment thread as a carrier thread 54, which is in engagement with second housing section 3 via a housing thread 56. A fixing element 57 is for further fixing second carrier 52 on housing 1. Furthermore, second carrier 52 has an interior tubular channel 58 for establishing a connection between the cabin and the interior of pressure capsule 34. The pressurized medium present in the cabin can thus be passed into the interior of pressure capsule 34, and the cabin pressure can be applied to the inside of pressure capsule 34.

At first, second carrier 52 is rotated to adjust the threshold pressure value, from which pressure capsule 34 operates valve tappet 22. In this way, distance C between sensing plate 35 and first end 34 of valve tappet 22 shown in the enlarged section in FIG. 1 is reduced or increased, and thus the switching range of control unit 100 is adjusted. The precise adjustment of the threshold pressure value, or the switching point is carried out by rotating first carrier 42, and thus changing the bias of spring unit 60 on valve tappet 22. After completing this adjustment, first carrier 42 and second carrier 52 are secured on housing 1 by means of fixing elements 47, 57.

In an initial situation of control unit 100, first adjustment unit 40 and second adjustment unit 50 are in the positions shown in FIG. 1. Furthermore, pressure capsule 34 is in the initial position indicated by solid lines. In this position, a distance C is present between first end 23 of valve tappet 22 and sensing plate 35 (cf. enlarged view of FIG. 1). Valve tappet 22 is in its closed position in which sealing cone 26, with its sealing edge 28, is in abutment on inner side wall 6 of first chamber 5 in a sealing relationship.

The pressurized medium present in the cabin passes into the interior of pressure capsule 34 via channel 58 formed by second carrier 52 and exerts a pressure corresponding to the cabin pressure on the membrane of pressure capsule 34. Furthermore, a pressurized medium of the ambient atmosphere passes into second chamber 10 via channel 12 and applies the ambient pressure on the outside of pressure capsule 34. The difference between the cabin pressure present within pressure capsule 34 and the ambient pressure exerted on the outside of pressure capsule 34 is the differential pressure exerted on pressure capsule 34, which is to be monitored by means of control unit 100 and which is to be changed if the threshold pressure value adjusted by means of adjustment units 40, 50 is exceeded.

In the present exemplary embodiment, the cabin pressure is to be greater than the ambient pressure. This results in a differential pressure applied on the pressure capsule, which leads to a deformation of pressure capsule 34 in direction A into the position indicated by broken lines. In the case where the displacement of sensing plate 35 caused by the deformation is greater than distance C, valve tappet 22 is only further pressed in direction A if the force exerted by pressure capsule 34 on valve tappet 22 (in direction A) is greater than the bias caused by spring unit 60 (in direction B). In this case, sealing cone 26 loses contact with the inner side wall 6 and is brought into its open position. Valve tappet 22 is now in its open position. Now, the passage of a further pressurized medium is possible through connecting line 7. This passage can control, for example, a downstream pressure relieve valve. Valve tappet 22, spring unit 60 and first carrier 42 can also form a switching valve controlled by a pressure capsule 34.

As the applied differential pressure is reduced at a later stage, the deformation of pressure capsule 34 is reversed. As soon as the bias in direction B caused by spring unit 60 is greater than the force caused by the differential pressure exerted on pressure capsule 34, valve tappet 22 returns to its closed position in which sealing cone 26 is in abutment on inner side wall 6 of first chamber 5 in a sealing relationship. Consequently, the passage through connecting line 7 is closed and any downstream pressure relief valve is correspondingly controlled.

The control unit 100 shown in FIG. 2 essentially differs in structure from the first embodiment by the fact that first carrier 42 and second carrier 52 are accessible and operable from a housing side. As shown in FIG. 2, the two adjustment units 40, 50 are accessible from the top of the housing due to this construction. Membrane body 30 of the actuator is formed as a metal bellows 32. Moreover, spring unit 60 connects first carrier 42 with sensing plate 35, which is coupled to the bottom end of metal bellows 32. Herein, spring unit 60 is coaxial with and at least partially within metal bellows 32. The stiffness of spring unit 60 is less than the stiffness of metal bellows 32. Further, valve tappet 22 of FIG. 2 is shown in its closed position and is part of a needle valve.

In a similar way of functioning as explained with reference to FIG. 1, if a threshold pressure value adjusted by means of adjustment unit 40, 50 is exceeded, metal bellows 32 extends toward the bottom to such an extent that it operates valve tappet 22 by means of sensing plate 35 or a rigid plate connected thereto, and presses it downwards. In this way, the needle valve can control any adjacent pneumatically controlled devices (not shown), such as, in particular, a pressure relief valve of an aircraft cabin.

Also in this embodiment, the coarse adjustment of the threshold pressure value is carried out by second adjustment unit 50, in particular by means of second carrier 52, and the fine adjustment is carried out by means of first adjustment unit 40, in particular by means of first carrier 42. By rotating an adjustment sleeve 43 of first carrier 42, the bias of spring unit 60 is adjusted. Moreover, the rotation of adjustment sleeve 43 and of second carrier 52 facilitates changing the distance between first end 23 of valve tappet 22 and sensing plate 35.

Both embodiments are distinguished, in particular, by the fact that an adjustment means for precisely adjusting the threshold pressure value of the switching point of control unit 100 via a coarse and fine adjustment is created by first adjustment unit 40 and second adjustment unit 50.

The use of a metallic membrane body 32, 34 for actuator 30 also ensures excellent long-term behavior. Moreover, the number of components required is substantially reduced in comparison with the conventional design.

Furthermore, the embodiment according to FIG. 1, in particular, is distinguished in that control unit 100 is largely insensitive to external influences such as vibrations and/or temperatures, or can be tuned to them.

Thus, for thermal compensation, the various thermal expansions of the components are utilized, for example, by selectively predetermining the material characteristics, in particular with respect to the coefficient of thermal expansion, so that in the sum total, the effect from thermal influence on the modulus of elasticity of actuator 30, in particular pressure capsule 34, is compensated.

Additionally or alternatively, the characteristics of the effective surfaces of the components and especially the bias of spring unit 60 can be tuned to each other in advance so that there is an optimized condition of equilibrium in the threshold pressure value or in the switching point with respect to the vibration behavior. This is preferably achieved by holding valve tappet 22 permanently in a position in which first end 23 of valve tappet 22 is pressed in abutment with sensing plate 35 by means of spring unit 60. In this manner, the wear of first end 23 can be reduced or eliminated. Also, undesirable shifting of the switching point is prevented.

LIST OF REFERENCE NUMERALS 1 housing
2 first housing section
3 second housing section
5 first chamber
6 inner side wall
7 connecting line
8 opening
9 opening
10 second chamber
12 channel
20 actuating body
22 valve tappet
23 first end 24 second end
26 sealing cone
28 sealing edge
30 actuator
32 bellows
34 pressure capsule
35 sensing plate
40 first adjustment unit
42 first carrier
43 adjustment sleeve
44 carrier thread
46 housing thread
47 fixing element
48 projection
49 groove
50 second adjustment unit
52 second carrier
54 carrier thread
56 housing thread
57 fixing element
58 channel
60 spring unit
62 first end
64 second end
100 control unit
A direction
B direction
C distance

The invention claimed is:

1. A control unit for actuating pressure relief valve of an aircraft cabin, comprising:
   a housing,
   an actuating body variably positionable in a first chamber of the housing along a connecting line extending between first and second openings in the housing,
   a pressure-controlled actuator variably positionable in a second chamber of the housing,
   a first channel through the housing for communicating ambient pressure to the second chamber,
   a second channel through the housing for communicating aircraft cabin pressure to the actuator,
   the first and second channels providing for applying a differential pressure on the pressure-controlled actuator,
   the pressure-controlled actuator providing for controlling operation of the actuating body at a predetermined threshold value of the differential pressure, and
   the threshold pressure value being adjustable by a first adjustment unit and a second adjustment unit,
   wherein the actuating body is adjustable within the first chamber by the first adjustment unit and the pressure-controlled actuator is adjustable by the second adjustment unit.

2. The control unit according to claim 1 in which at least one of the first adjustment unit and the second adjustment unit includes a variably adjustable adjustment element having a rotatable threaded element to vary the distance between the actuating body and the actuator.

3. The control unit according to claim 1 in which a spring unit is coupled with the actuator and/or the actuating body.

4. The control unit according to claim 1 in which the actuating body comprises a slidably guided piston including a valve tappet.

5. The control unit according to claim 1, wherein the first adjustment unit and the second adjustment unit are formed and arranged to be accessible from one side of the housing.

6. The control unit according to claim 1, in which the actuator has a working range and is adapted so that a constant temperature compensation is adjustable in the working range.

7. The control unit according to claim 1, in which the actuator comprises a pressure capsule having a working range of 300 mbar to 900 mbar and the pressure capsule is adapted so that constant temperature compensation is adjustable in the working range.

8. The control unit according to claim 1 in which the actuating body and the actuator continuously in contact each other during the intended use of the control unit.

9. The control unit according to claim 1 in which the actuator is provided with an actuating unit, including a sensing plate, which is contactable with the actuating body.

10. The control unit according to claim 1, in which the actuator comprises a pressure capsule having a working range of 500 mbar to 700 mbar, and the pressure capsule is adapted so that constant temperature compensation is adjustable in the working range.

11. The control unit according to claim 1, in which the second adjustment unit is adapted for coarse adjustment of the threshold pressure value and the first adjustment unit is adapted for fine adjustment of the threshold pressure value.

12. The control unit according claim 11 in which the actuator comprises a membrane body deformable as a function of the differential pressure.

13. The control unit according claim 1 in which the actuator comprises a membrane body deformable as a function of the differential pressure.

14. The control unit according to claim 13, in which the membrane body comprises a bellows or a pressure capsule made of metal.

15. The control unit according to claim 1 in which the actuating body comprises a valve body for opening or closing the connecting line, which is in communication with the first chamber.

16. The control unit according to claim 15, in which the valve body includes a sealing unit including a sealing edge for opening or closing the connecting line.

17. The control unit according to claim 1 in which the actuating body and the actuator are spaced from each other by a predetermined distance (C) in a first position, and are in contact with each other to actuate the actuating body in a second position.

18. The control unit according to claim 17 in which the actuating body is held in the second position by a force exerted by a spring unit.

19. The control unit according to claim 17, in which the actuating body is held in the second position by a force exerted by a spring unit.

20. The control unit according to claim 1 in which, to compensate thermal influences, the dimensions and material characteristics of the individual components of the control unit, including the actuating body, the actuator, the adjustment units, and/or the housing are selectively tuned with respect to each other.

21. The control unit according to claim 20, in which a first housing section, a second housing section, the actuating body, the actuator, including a pressure capsule, and/or at least one of the adjustment units comprise at least a coefficient of linear expansion as a material characteristic, wherein the coefficients of linear expansion of at least two of the afore-mentioned components are selectively tuned to each other to compensate thermal influences.

22. The control unit according to claim 20, in which a first housing section, a second housing section, the actuating body, the actuator, including a pressure capsule, and/or at least one of the adjustment units comprise a modulus of elasticity as a material characteristic, wherein the moduli of elasticity of at least two of the afore-mentioned components are selectively tuned to each other to compensate thermal influences.

23. The control unit according to claim 21, in which the first housing section, the second housing section, the actuating body, the actuator, including the pressure capsule, and at least one of the adjustment units comprise a modulus of elasticity as a material characteristic, wherein the moduli of elasticity of at least two of the aforementioned components are selectively tuned to each other to compensate thermal influences.

24. The control unit according to claim 1 in which the first adjustment unit comprises a first carrier by which the actuating body is held and is variably positionable in the first chamber and/or the second adjustment unit comprises a second carrier by which the actuator is held and variably positionable in the second chamber.

25. The control unit according to claim 24, in which the first carrier and/or the second carrier comprises a carrier thread, wherein the carrier thread is engagable with a housing thread.

26. The control unit according to claim 24 in which the second carrier forms the second channel.

27. The control unit according to claim 24 in which the first carrier and/or the second carrier comprises a fixing element for securing the first carrier and/or the second carrier, wherein a carrier thread is engagable with a housing thread.

28. The control unit according to claim 27, in which the fixing element is engagable with the carrier thread.

* * * * *